United States Patent
Zhao et al.

(10) Patent No.: US 12,520,373 B2
(45) Date of Patent: Jan. 6, 2026

(54) METHOD AND APPARATUS FOR SIDELINK DATA TRANSMISSION DURING A DISCONTINUOUS RECEPTION (DRX) ON DURATION OF A SIDELINK RECEIVING DEVICE

(71) Applicant: GUANGDONG OPPO MOBILE TELECOMMUNICATIONS CORP., LTD., Guangdong (CN)

(72) Inventors: Zhenshan Zhao, Dongguan (CN); Qianxi Lu, Dongguan (CN); Zhe Fu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 298 days.

(21) Appl. No.: 17/881,888

(22) Filed: Aug. 5, 2022

(65) Prior Publication Data
US 2022/0377835 A1    Nov. 24, 2022

Related U.S. Application Data

(63) Continuation of application No. PCT/CN2020/074484, filed on Feb. 7, 2020.

(51) Int. Cl.
*H04W 76/28* (2018.01)
*H04W 24/08* (2009.01)
*H04W 92/18* (2009.01)

(52) U.S. Cl.
CPC .......... *H04W 76/28* (2018.02); *H04W 24/08* (2013.01); *H04W 92/18* (2013.01)

(58) Field of Classification Search
CPC ..... H04W 76/28; H04W 24/08; H04W 92/18; H04W 52/0219; H04W 76/23;
(Continued)

(56) References Cited

U.S. PATENT DOCUMENTS 9,661,683 B2    5/2017    Horneman
2011/0237231 A1    9/2011    Horneman
(Continued)

FOREIGN PATENT DOCUMENTS

CN    102204392 A    9/2011
CN    107241786 A    10/2017
(Continued)

OTHER PUBLICATIONS

Office Action of the Indian application No. 202227047092, issued on Nov. 22, 2022. 6 pages.
(Continued)

*Primary Examiner* — Atique Ahmed
(74) *Attorney, Agent, or Firm* — PERKINS COIE LLP

(57) ABSTRACT

The embodiments of the disclosure provide a data transmission method and apparatus, a parameter adjustment method and apparatus, and a terminal device. The data transmission method comprises: a first terminal device acquiring first discontinuous reception (DRX) configuration information, the first DRX configuration information being used for determining a continuously monitoring duration of a second terminal device, and the first terminal device sending the sidelink data to the second terminal device within the continuously monitoring duration of the second terminal device.

20 Claims, 18 Drawing Sheets

(58) Field of Classification Search
CPC . H04W 52/0216; H04W 72/51; H04W 72/53; H04W 76/14; H04W 72/20; H04W 4/46; Y02D 30/70
See application file for complete search history.

(56) References Cited

U.S. PATENT DOCUMENTS

| | | | | |
|---|---|---|---|---|
| 2012/0155355 | A1* | 6/2012 | Kwon | H04W 76/28 370/311 |
| 2016/0044740 | A1 | 2/2016 | Siomina et al. | |
| 2016/0128084 | A1 | 5/2016 | Novlan | |
| 2017/0171690 | A1* | 6/2017 | Kim | H04L 67/125 |
| 2018/0124813 | A1* | 5/2018 | Li | H04W 72/121 |
| 2019/0053305 | A1 | 2/2019 | Saiwai et al. | |
| 2019/0090198 | A1 | 3/2019 | Zhao | |
| 2019/0098617 | A1* | 3/2019 | Li | H04W 72/12 |
| 2019/0098689 | A1 | 3/2019 | Wei | |
| 2019/0116626 | A1* | 4/2019 | Zhao | H04W 76/14 |
| 2019/0158229 | A1 | 5/2019 | Wei | |
| 2020/0015176 | A1* | 1/2020 | Li | H04L 1/1861 |
| 2023/0034294 | A1* | 2/2023 | Zhang | H04W 52/0216 |
| 2023/0337140 | A1* | 10/2023 | Miao | H04L 5/0053 |
| 2024/0107454 | A1* | 3/2024 | Lin | H04W 76/28 |

FOREIGN PATENT DOCUMENTS

| | | | | |
|---|---|---|---|---|
| CN | 108307489 | A | | 7/2018 |
| CN | 109479189 | A | | 3/2019 |
| CN | 111165029 | A * | 5/2020 | H04W 92/18 |
| EP | 3499975 | A1 | | 6/2019 |
| WO | 2015130076 | A1 | | 9/2015 |
| WO | 2015176251 | A1 | | 11/2015 |
| WO | 2017135428 | A1 | | 8/2017 |
| WO | 2017138378 | A1 | | 8/2017 |
| WO | 2018016882 | A1 | | 1/2018 |
| WO | WO-2018064477 | A1 * | 4/2018 | |
| WO | WO-2021139521 | A1 * | 7/2021 | H04W 52/0232 |

OTHER PUBLICATIONS

Intel Corporation et al:"Discontinuous reception over SL", 3GPP Draft; R2-1703502, vol. RAN WG2, No. Spokane, USA; Apr. 3-7, 2017. 2 pages.
Intel Corporation et al:"DRX in sidelink", 3GPP Draft; R2-1701309, vol. RAN WG2, No. Athens, Greece; Feb. 13-17, 2017. 2 pages.
Supplementary European Search Report in the European application No. 20917659.3, mailed on Dec. 15, 2022. 11 pages.
Notice of Allowance of the Japanese application No. 2022-547851, issued on Jun. 28, 2024, 6 pages with English translation.
First Office Action of the Chinese application No. 202211103043.3, issued on Jul. 27, 2024, 14 pages with English translation.
First Office Action of the Japanese application No. 2022-547851, issued on Dec. 12, 2023, 9 pages with English translation.
Intel Corporation, "Summary#4 for AI 7.2.4.2.2 Mode-2 Resource Allocation", 3GPP TSG RAN WG1 #99 R1-1913569, Nov. 18-22, 2019, the whole document, 47 pages.
Search Report by Registered Search Organization of the Japanese application No. 2022-547851, issued on Nov. 27, 2023, 40 pages with English translation.
International Search Report in the international application No. PCT/CN2020/074484, mailed on Sep. 2, 2020.
English translation of the Written Opinion of the International Search Authority in the international application No. PCT/CN2020/074484, mailed on Sep. 2, 2020.
Second Office Action of the Chinese application No. 202211103043.3, issued on Oct. 31, 2024, 13 pages with English translation.
Reject Decision of the Chinese application No. 202211103043.3, issued on Jan. 8, 2025, 9 pages with English translation.
First Office Action of the Korean application No. 10-2022-7028391, issued on Apr. 17, 2025. 11 pages with English translation.

* cited by examiner

METHOD AND APPARATUS FOR SIDELINK DATA TRANSMISSION DURING A DISCONTINUOUS RECEPTION (DRX) ON DURATION OF A SIDELINK RECEIVING DEVICE

CROSS-REFERENCE TO RELATED APPLICATIONS

The application is a continuation of International Application No. PCT/CN2020/074484 filed on Feb. 7, 2020, the disclosure of which is hereby incorporated by reference in its entity.

BACKGROUND

The subject of sidelink enhancement discusses to introduce a Discontinuous Reception (DRX) mechanism in sidelink transmission. In this case, a terminal device is not in a receiving state all the time, but receives data within an on duration according to the DRX configuration, and the terminal device is in a continuous reception (or continuously monitoring) state within the on duration. If the terminal device does not receive the data, the terminal device switches to a DRX state, that is, an off duration, so that a purpose of power saving can be achieved. However, for unicast and multicast communication, data sent by a sending end is required to be received by a receiving end. Therefore, after the DRX mechanism is introduced, how to ensure the reliability of sidelink transmission is a problem that needs to be resolved.

SUMMARY

Embodiments of the disclosure relate to the technical field of mobile communication, and specifically, to a data transmission method and apparatus, a parameter adjustment method and apparatus, and a terminal device.

Embodiments of the disclosure provide a data transmission method and apparatus, a parameter adjustment method and apparatus, and a terminal device.

Embodiments of the disclosure provide a data transmission method. The method includes the following operations. A first terminal device acquires first Discontinuous Reception (DRX) configuration information, where the first DRX configuration information is used for determining a continuously monitoring duration of a second terminal device. The first terminal device sends sidelink data to the second terminal device within the continuously monitoring duration of the second terminal device.

Embodiments of the disclosure provide a data transmission apparatus for use in a first terminal device. The apparatus includes a memory storing processor-executable instructions, and a processor. The processor is configured to execute the stored processor-executable instructions to perform operations of: acquiring first Discontinuous Reception (DRX) configuration information, wherein the first DRX configuration information is used for determining a continuously monitoring duration of a second terminal device; and sending sidelink data to the second terminal device within the continuously monitoring duration of the second terminal device.

Embodiments of the disclosure provide a chip including a processor, configured to invoke and run a computer program from a memory, to cause a first terminal device having the chip mounted to perform operations of: acquiring first Discontinuous Reception (DRX) configuration information, wherein the first DRX configuration information is used for determining a continuously monitoring duration of a second terminal device; and sending sidelink data to the second terminal device within the continuously monitoring duration of the second terminal device.

BRIEF DESCRIPTION OF THE DRAWINGS

The drawings described herein are used to provide a further understanding of the disclosure, and constitute a part of the disclosure. The exemplary embodiments of the disclosure and the description thereof are used to explain the disclosure, but do not constitute improper limitations to the disclosure.

The drawings described herein are used to provide a further understanding of the disclosure, and constitute a part of the disclosure. The exemplary embodiments of the disclosure and the description thereof are used to explain the disclosure, but do not constitute improper limitations to the disclosure. In the drawings.

DETAILED DESCRIPTION

The technical solutions in the embodiments of the disclosure will be described below with reference to the drawings in the embodiments of the disclosure. It is apparent that the described embodiments are only part of the embodiments of the disclosure, not all the embodiments. All other embodiments obtained by those of ordinary skill in the art on the basis of the embodiments in the disclosure without creative work all fall within the scope of protection of the disclosure.

The technical solution of the embodiments of the disclosure is applicable to various communication systems, such as a Long Term Evolution (LTE) system, an LTE Frequency Division Duplexing (FDD) system, an LTE Time Division Duplexing (TDD) system, 5G communication system, or a future communication system.

Figure 1:
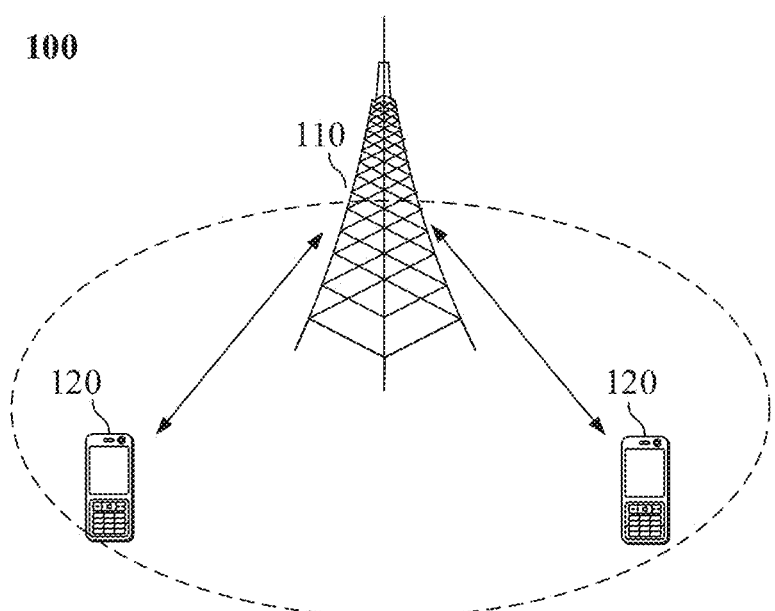
FIG. 1 is a schematic diagram of a communication system architecture according to an embodiment of the disclosure.

Exemplarily, a communication system 100 applied in an embodiment of the disclosure is shown in FIG. 1. The communication system 100 may include a network device 110. The network device 110 may be a device communicating with a terminal 120 (or called a communication terminal or a terminal). The network device 110 may provide communication coverage for a specific geographical region, and may communicate with the terminal located in the coverage region. Optionally. the network device 110 may be an Evolutional Node B (eNB or eNodeB) in the LTE system or a wireless controller in a Cloud Radio Access Network (CRAN). Alternatively, the network device may be a mobile switching center, a relay station, an access point, a vehicle device, a wearable device, a hub, a switch, a network bridge, a router, a network-side device in a 5G network, a network device in a future communication system, or the like.

The communication system 100 further includes at least one terminal 120 within the coverage of the network device 110. The "terminal" used herein includes. but is not limited to, an apparatus configured to receive/transmit a communication signal through a wired line connection, for example, through Public Switched Telephone Network (PSTN), Digital Subscriber Line (DSL), digital cable, and direct cable connections, and/or another data connection/network), and/ or through a wireless interface, for example, for a cellular network, a Wireless Local Area Network (WLAN), a digital television network like a DVB-H network, a satellite network and an AM-FM broadcast transmitter, and/or an apparatus of another terminal configured to receive/transmit the communication signal, and/or an Internet of Things (IoT) device. The terminal configured to communicate through a wireless interface may be called as a "wireless communication terminal", a "wireless terminal", or a "mobile terminal". Examples of the mobile terminal include, but are not limited to, a satellite or a cellular phone; a Personal Communications System (PCS) terminal that may combine a cellular radiotelephone with data processing, facsimile, and data communications capabilities; a PDA that may include a radiotelephone, a pager, an Internet/intranet access, a Web browser, a Notepad, a calendar, and/or a Global Positioning System (GPS) receiver; and a conventional laptop and/or handheld receiver or another electronic apparatus including a radiotelephone transceiver. The terminal may be an access terminal, User Equipment (UE), a user unit, a user station, a mobile station, a mobile platform, a remote station, a remote terminal, a mobile device, a user terminal, a terminal, a wireless communication device, a user agent, or a user device. The access terminal may be a cellular phone, a cordless phone, a Session Initiation Protocol (SIP) phone, a Wireless Local Loop (WLL) station, a Personal Digital Assistant (PDA), a handheld device having a wireless communication function, a computing device or another processing device of a wireless modem, a vehicle device, a wearable device, a terminal in a 5G network, or a terminal in a future evolved PLMN.

Optionally, terminal Device to Device (D2D) communication may be achieved among the terminals 120.

Optionally, the 5G communication system or the 5G network may further be called as a New Radio (NR) system or an NR network.

FIG. 1 exemplarily shows a network device and two terminals. Optionally, the communication system 100 may include a plurality of network devices, and the coverage of each network device may include other numbers of terminals. The embodiments of the disclosure are not limited thereto.

Optionally, the communication system 100 may further include other network entities such as a network controller and a mobile management entity. The embodiments of the disclosure are not limited thereto.

It is to be understood that, a device having a communication function in a network/system in the embodiments of the disclosure may be called as a communication device. By using the communication system 100 shown in FIG. 1 as an example, the communication device may include a network device 110 having a communication function and a terminal 120. The network device 110 and the terminal 120 may be specific devices described above, which are not described herein again. The communication device may further include other devices in the communication system 100, such as other network entities such as a network controller and a mobile management entity. The embodiments of the disclosure are not limited thereto.

It is to be understood that, terms "system" and "network" in the disclosure may usually be exchanged in the disclosure. The term "and/or" in the specification is merely an association relationship describing related objects, which means that there may be three relationships, for example, A and/or B may indicate three cases: A exists alone, A and B exist simultaneously, and B exists alone. In addition, the character "/" in this paper generally indicates that the related objects are in an "or" relationship.

For ease of understanding of the technical solutions in the embodiments of the disclosure, the technical solutions related to the embodiments of the disclosure are described below.

Device to Device (D2D)

D2D communication is based on a Sidelink (SL) transmission technology. Different from a manner in a conventional cellular system of receiving or sending communication data by using a base station, an Internet of vehicles system adopts a manner of D2D communication (that is, a manner of direction device to device communication). Therefore, higher spectral efficiency and lower transmission time delay can be realized. For D2D communication, a Third Generation Partnership Project (3GPP) defines two transmission modes: Mode A and Mode B. The Mode A and Mode B are described below.

Figure 2A:
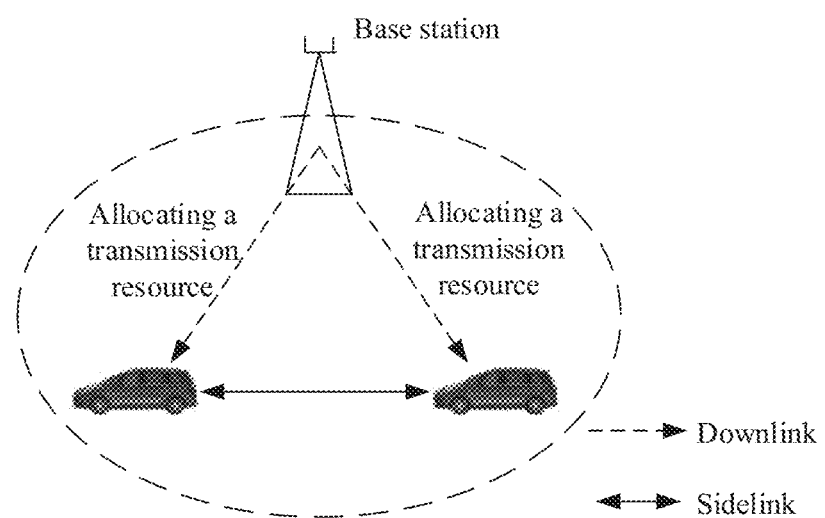
FIG. 2A is a schematic diagram of a mode A according to an embodiment of the disclosure.

Mode A: as shown in FIG. 2A, a transmission resource of a terminal device is allocated by a base station, and the terminal device transmits data on a sidelink according to the resource allocated by the base station. The base station may allocate a single transmission resource to the terminal device, or may allocate a semi-static transmission resource to the terminal device.

Figure 2B:
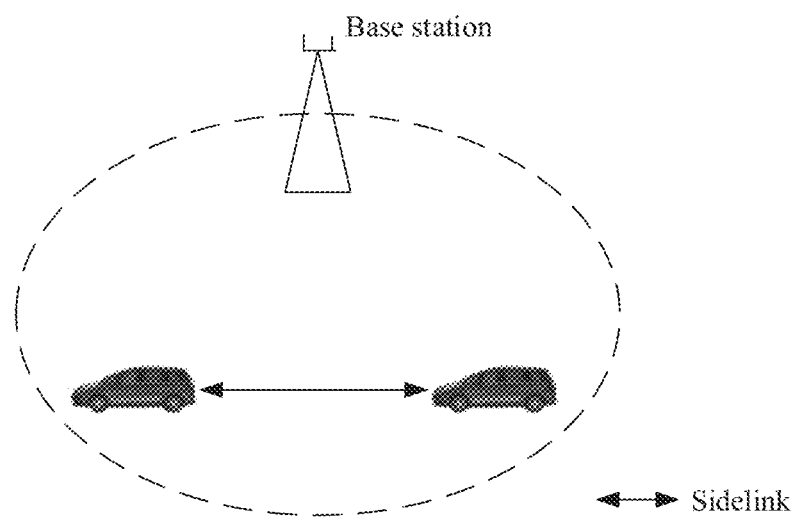
FIG. 2B is a schematic diagram of a mode B according to an embodiment of the disclosure.

Mode B: as shown in FIG. 2B, a terminal device selects a resource from a resource pool for data sending. Specifically, the terminal device may select a transmission resource from the resource pool through monitoring, or randomly select the transmission resource from the resource pool.

New Radio (NR)-V2X

In NR-V2X, automatic driving is required. Therefore, a higher requirement is proposed for data interaction between vehicles, for example, higher throughput, shorter time delay, higher reliability, larger coverage, and more flexible resource allocation.

An NR-V2X system introduces various transmission modes, including a mode 1 and a mode 2. The mode 1 is that the network device allocates the transmission resource for the terminal device (corresponding to the above Mode A), and the mode 2 is that the terminal device selects the transmission resource (corresponding to the above Mode B).

Figure 3A:
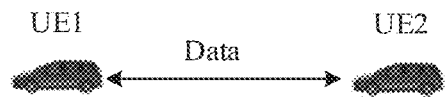
FIG. 3A is a schematic unicast diagram according to an embodiment of the disclosure.
Figure 3B:
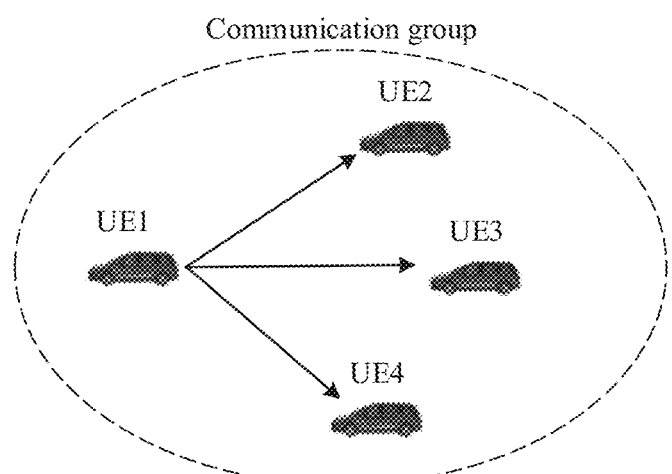
FIG. 3B is a schematic multicast diagram according to an embodiment of the disclosure.
Figure 3C:
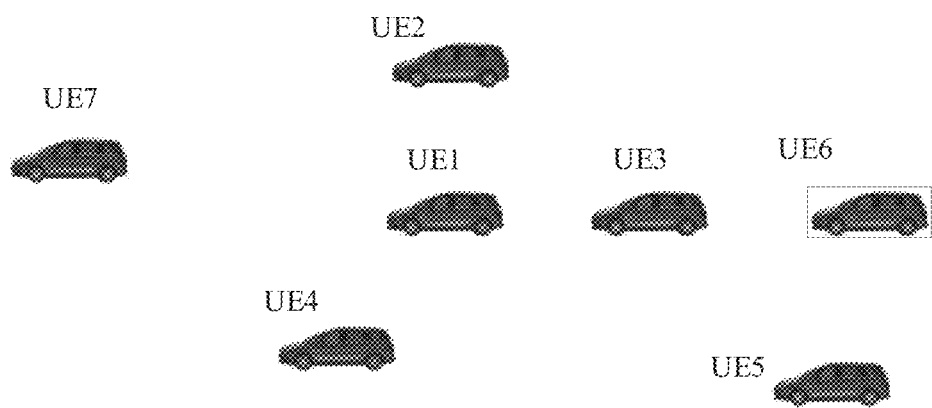
FIG. 3C is a schematic broadcast diagram according to an embodiment of the disclosure.

LTE-V2X supports a broadcast transmission mode. In addition, a unicast and multicast transmission mode is introduced in the NR-V2X. For the unicast transmission mode, a receiving end only has one terminal device. As shown in FIG. 3A, unicast transmission is achieved between UE 1 and UE 2. For multicast transmission, the receiving end is all terminal devices in a communication group, or all terminal devices in a certain transmission distance. As shown in FIG. 3B, UE 1, UE 2, UE 3, and UE 4 form a communication group. The UE 1 transmits data, and other terminal devices in the communication group are all receiving ends. For the broadcast transmission mode, the receiving end is any terminal device. As shown in FIG. 3C, the UE 1 is a sending end, and other terminal devices around the sending end are all receiving ends.

DRX Mechanism of NR Uu Port

In a wireless network, if the terminal device monitors a Physical Downlink Control Channel (PDCCH) all the time, and receives and sends data according to indication information sent by a network side, relatively large power dissipation of the terminal device is resulted in. Therefore, a 3GPP standard protocol introduces a DRX energy-saving strategy in an LTE system.

Figure 4:
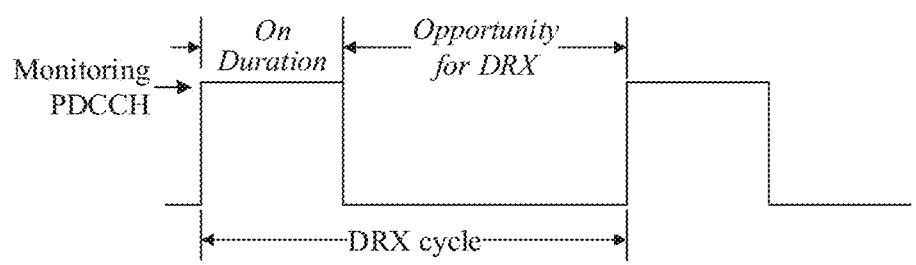
FIG. 4 is a schematic diagram of a DRX cycle according to an embodiment of the disclosure.

A basic mechanism of DRX is to configure a DRX cycle for the terminal device in a Radio Resource Control Connected (RRC_CONNECTED) state. As shown in FIG. 4, the DRX cycle is composed of "on duration" and "opportunity for DRX". Within "on duration" time (also called as a continuously monitoring range), the terminal device monitors and receives the PDCCH (that is, the terminal device is in an active period). If the terminal does not receive the PDCCH within the continuously monitoring range, continuously monitoring stops, and the terminal device switches to a DRX state within the "opportunity for DRX" time, so that the terminal device reduces power consumption by not receiving the PDCCH (that is, the terminal device is in a dormant period). In a DRX operation, the terminal device controls on duration and off duration of the terminal device according to some timer parameters configured by a network. It is to be noted that, the terminal device switches to the DRX state (that is, the off duration.) within the "opportunity for DRX" time In sidelink-based transmission, a DRX mechanism is not introduced. Considering that an Internet of vehicles service may be sent in a manner of broadcast, all of the terminal devices are in a reception state when not sending data, resulting in large power consumption of the terminal device. In particular, for a handheld terminal, how to reduce power consumption is a problem that needs to be resolved.

The subject of sidelink enhancement discusses to introduce a DRX mechanism in sidelink transmission. In this case, the terminal device is not in the reception state all the time, but receives data within the on duration according to DRX configuration. If the terminal device does not receive the data, it switches to DRX (off duration), so that a purpose of power saving can be achieved. However, for unicast and multicast communication, data sent by a sending end is required to be received by a receiving end. Therefore, after the DRX mechanism is introduced, how to ensure the reliability of sidelink transmission is a problem that needs to be resolved. Based on this, the following technical solutions of the embodiments of the disclosure are provided.

Figure 5:
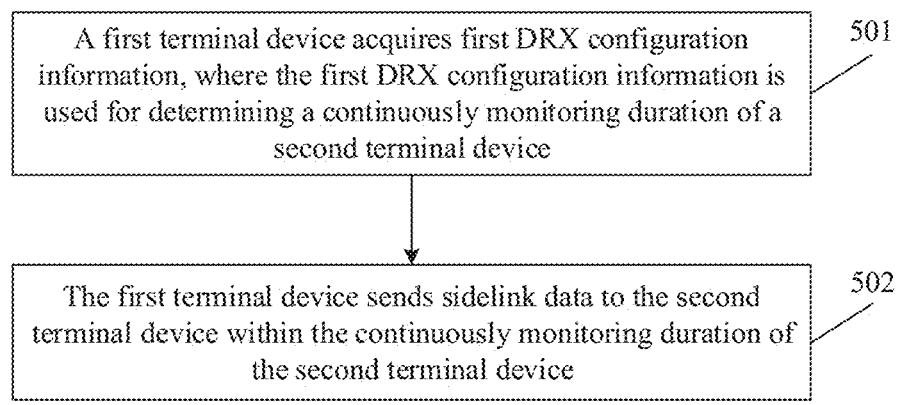
FIG. 5 is a schematic flowchart of a data transmission method according to an embodiment of the disclosure.

FIG. 5 is a schematic flowchart of a data transmission method according to an embodiment of the disclosure. As shown in FIG. 5, the data transmission method includes the following steps.

At step 501, a first terminal device acquires first DRX configuration information, where the first DRX configuration information is used for determining a continuously monitoring duration of a second terminal device.

In the embodiment of the disclosure, the first terminal device is a sending end of sidelink data, and the second terminal device is a receiving end of the sidelink data.

In the embodiment of the disclosure, the first DRX configuration information is used for determining the continuously monitoring duration of the second terminal device. Herein, the continuously monitoring duration is a duration that is determined according to a first DRX parameter in the first DRX configuration information. The first DRX parameter is used for determining a continuously monitoring range of the second terminal device. That is to say, a first duration is the continuously monitoring range of the second terminal device. For example, the first DRX parameter is drx-onDurationTimer, and a duration corresponding to an operation period of drx-onDurationTimer is the continuously monitoring duration.

In the embodiment of the disclosure, for a scenario of unicast communication and multicast communication, the sending end needs to learn the DRX configuration information (that is, the first DRX configuration information) of the receiving end, so as to ensure that data sent by the sending end can be received by the receiving end. The sending end (that is, the first terminal device) may acquire the DRX configuration information of the receiving end (that is, the second terminal device) through any of the following manners.

In a first manner, the first terminal device acquires network configuration information, and the network configuration information includes the first DRX configuration information.

Herein, the first DRX configuration information is the DRX configuration information of the second terminal device.

In an optional implementation, the network configuration information is carried in a System Information Block (SIB) message, or Radio Resource Control (RRC) signaling, or Downlink Control Information (DCI).

In a second manner, the first terminal device acquires pre-configuration information, and the pre-configuration information includes the first DRX configuration information.

Herein, the first DRX configuration information is the DRX configuration information of the second terminal device.

In the embodiment of the disclosure, optionally, for any of the above manners, the first terminal device acquires resource pool configuration information, and the resource pool configuration information includes the first DRX configuration information.

In a third manner, 1) the first terminal device receives the first DRX configuration information sent by the second terminal device, or 2) the first terminal device receives configuration information sent by a third terminal device, where the configuration information includes the first DRX configuration information, and the first terminal device, the second terminal device and the third terminal device belong to a same communication group.

Herein, the first DRX configuration information is the DRX configuration information of the second terminal device.

Herein, the DRX configuration information is configured to each terminal device in the communication group by a group head terminal device. The group head terminal device may be the first terminal device, or the second terminal device, or the third terminal device. In a case where the group head terminal device is the first terminal device, the first terminal device may naturally learn the first DRX configuration information. In a case where the group head terminal device is the second terminal device, the first terminal device may acquire the first DRX configuration information from the second terminal device. In a case where the group head terminal device is the third terminal device, the first terminal device may acquire the first DRX configuration information from the third terminal device, but it is not limited herein, and the first terminal device may alternatively acquire the first DRX configuration information from the second terminal device.

In an optional implementation, the first DRX configuration information is carried in Sidelink Control Information (SCI), or PC5-RRC signaling, or a Media Access Control Control Element (MAC CE).

Optionally, the first DRX configuration information is carried in second-order SCI, that is, the first DRX configuration information is carried through an SCI format 0-2.

For example, the second terminal device or the third terminal device sends the SCI to the first terminal device, and the SCI carries the first DRX configuration information. Specifically, the SCI sent by the second terminal device or the third terminal device includes first-order SCI (an SCI format 0-1) and the second-order SCI (an SCI format 0-2). The first DRX configuration information is carried in the second-order SCI. The first-order SCI is configured to indicate a transmission resource of PSSCH scheduled by the SCI, and the second-order SCI is configured to indicate a parameter that demodulates the PSSCH scheduled by the SCI.

For example, the second terminal device or the third terminal device sends the PC5-RRC signaling to the first terminal device, and the PC5-RRC signaling carries the first DRX configuration information. Specifically, when the second terminal device or the third terminal device establishes a connection with the first terminal device, the first DRX configuration information is carried through the PC5-RRC signaling.

For example, the second terminal device or the third terminal device sends the sidelink data to the first terminal device, and the first DRX configuration information is carried in the MAC CE of the sidelink data. Specifically, the sidelink data is carried in the PSSCH sent by the second terminal device or the third terminal device, and the MAC CE of the sidelink data includes the first DRX configuration information.

In an optional implementation, the first DRX configuration information includes, but is not limited to, at least one of the following DRX parameters.

A first DRX parameter is used for determining a duration (continuously monitoring time) at the beginning of the DRX cycle, for example, drx-onDurationTimer.

A second DRX parameter is used for determining a duration after a PSCCH opportunity (the PSCCH is transmitted in the PSCCH opportunity, and the PSCCH indicates that there is sidelink data transmitted), for example, drx-InactivityTimer.

A third DRX parameter is used for determining a starting subframe of the DRX cycle and/or the DRX cycle, for example, drx-LongCycleStartOffset, including drx-LongCycle and drx-StartOffset.

A fourth DRX parameter is used for determining a slot offset of starting time of the first DRX parameter in one subframe (the subframe is determined based on the third DRX parameter), for example, drx-SlotOfset.

It is to be noted that, according to the above manner, the first terminal device may acquire the DRX configuration information (that is, the first DRX configuration information) of the second terminal device, but it is not limited herein. The second terminal device may alternatively acquire the DRX configuration information (for a scenario that the first terminal device is the receiving end of the sidelink data, and the second terminal device is the sending end of the sidelink data) of the first terminal device according to the above manner. That is to say, the DRX configuration information may be exchanged between the first terminal device and the second terminal device according to the above manner.

Figure 6:
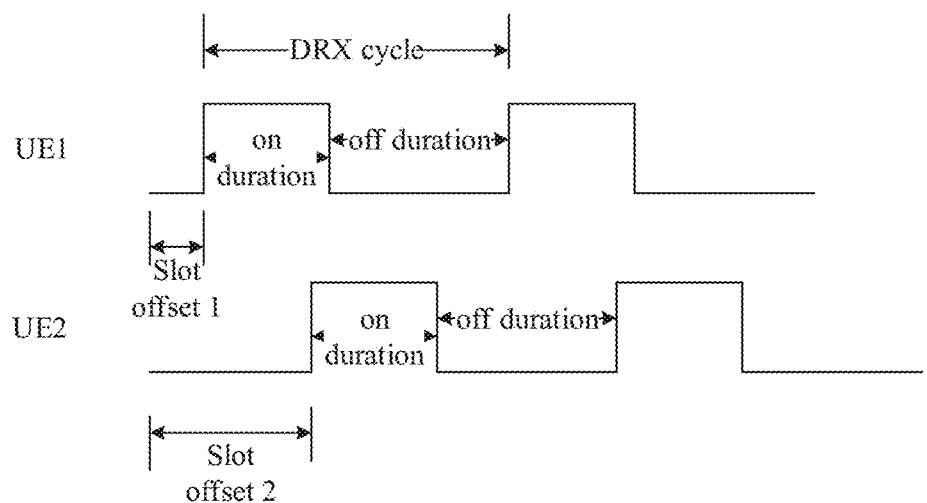
FIG. 6 is a first schematic diagram of a DRX pattern according to an embodiment of the disclosure.

In an optional implementation, different terminal devices may have different DRX configuration information. For example, UE 1 and UE 2 are in two cells, a network configures the DRX configuration information for the UE 1 and the UE 2, and base stations of the two cells may be configured with different DRX parameters, so that the UE 1 and the UE 2 may have different DRX configuration information. As shown in FIG. 6, the UE 1 and the UE 2 need to perform sidelink data transmission. If the DRX configuration information is not exchanged, a moment when one terminal device sends the sidelink data is in the off duration of the other terminal device, so that the other terminal device cannot correctly receive the sidelink data. As a result, the DRX configuration information is required to be exchanged between the two terminal devices.

At step 502, the first terminal device sends sidelink data to the second terminal device within the continuously monitoring duration of the second terminal device.

In the embodiment of the disclosure, by exchanging the DRX configuration information, the first terminal device and the second terminal device may learn the DRX configuration information of each other. In this way, when the first terminal device sends the sidelink data, the sidelink data is sent within the continuously monitoring duration (that is, the on duration) of the second terminal device. Therefore, the second terminal device can correctly receive the sidelink data. Likewise, when the second terminal device sends the sidelink data, the sidelink data is sent within the continuously monitoring duration (that is, the on duration) of the first terminal device. Therefore, the first terminal device can correctly receive the sidelink data.

Further, in an optional implementation, the first terminal device sends first indication information to the second terminal device. The first indication information is used for determining a transmission time when the first terminal device transmits the sidelink data next time. The first indication information is used for the second terminal device to adjust a continuously monitoring duration of the second terminal device, and the transmission time when the first terminal device transmits the sidelink data next time is within the continuously monitoring duration.

Further, the second terminal device may adjust the continuously monitoring duration of the second terminal device by adopting any of the following manners.

A) The second terminal device adjusts one or more DRX parameters in first DRX configuration information. The one or more DRX parameters are used for determining the continuously monitoring duration of the second terminal device, and the transmission time when the first terminal device transmits the sidelink data next time is within the continuously monitoring duration.

B) The second terminal device starts a first timer before the transmission time when the sidelink data is transmitted next time. The first timer is used for determining the continuously monitoring duration of the second terminal device, and the transmission time when the first terminal device transmits the sidelink data next time is within the continuously monitoring duration.

Herein, during the operation of the first timer (or before its expiry), the second terminal device is in a continuously monitoring (that is, on duration) state, and the time period corresponding to the operation period of the first timer is the continuously monitoring duration of the second terminal device. Herein, the first timer, for example, is a timer determined by the first DRX parameter (for example, drx-onDurationTimer), or a timer determined by the second DRX parameter (for example, drx-InactivityTimer), or a timer determined by other DRX parameters.

Through the above technical solutions, the first terminal device and the second terminal device exchange DRX configuration information, or the second terminal device adjusts a DRX parameter according to a transmission resource reserved by the first terminal device, so that sidelink transmission is performed in a DRX on duration of the second terminal device. Therefore, the second terminal device can correctly receive the sidelink data sent by the first terminal device, thereby ensuring the reliability of sidelink transmission.

Figure 7:
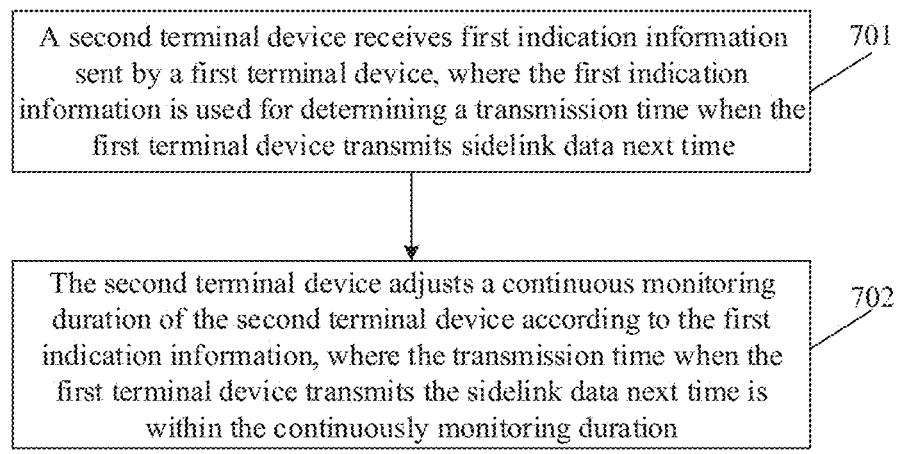
FIG. 7 is a schematic flowchart of a parameter adjustment method according to an embodiment of the disclosure.

FIG. 7 is a schematic flowchart of a parameter adjustment method according to an embodiment of the disclosure. As shown in FIG. 7, the parameter adjustment method includes the following steps.

At step 701, a second terminal device receives first indication information sent by a first terminal device, where the first indication information is used for determining a transmission time when the first terminal device transmits sidelink data next time.

In the embodiment of the disclosure, the first terminal device is a sending end of sidelink data, and the second terminal device is a receiving end of the sidelink data.

In an optional implementation, the second terminal device receives SCI sent by the first terminal device at a first moment, where the SCI carries the first indication information, and the first indication information is configured to indicate a first time interval. The transmission time when the first terminal device transmits the sidelink data next time is equal to the first moment plus the first time interval.

Figure 8:
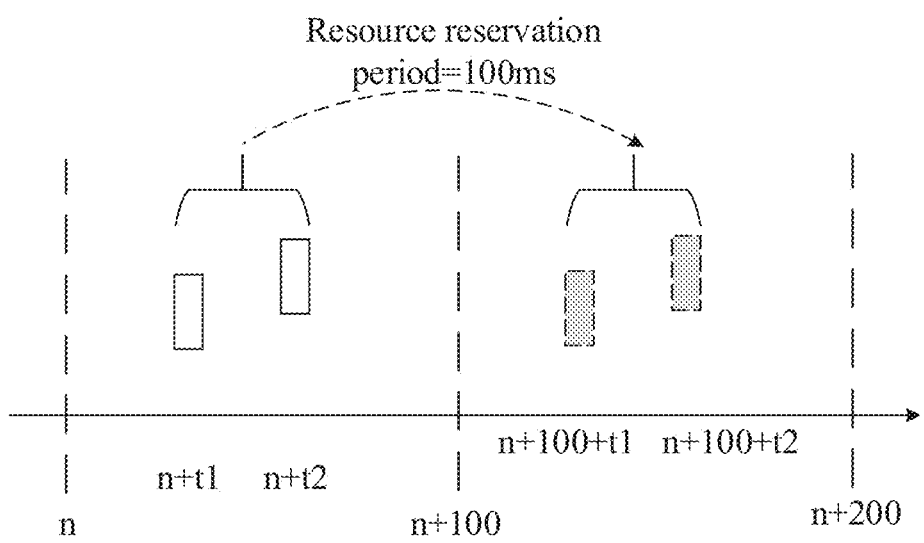
FIG. 8 is a schematic diagram of a reserved resource according to an embodiment of the disclosure.

The technical solutions of the embodiments of the disclosure are applicable to, but are not limited to, the NR-V2X scenario. The NR-V2X supports a periodic service and a non-periodic service. For the periodic service, when the terminal device selects transmission resources, the resources may be reserved for transmitting next sidelink data. Whether the terminal device is supported to reserve the transmission resource for the next sidelink data is generally configurable, and can be represented By using a parameter "reserveResourceDifferentTB". When the parameter is a first value (for example, "enable"), it indicates that the terminal device may reserves the transmission resources for the next sidelink data. When the parameter is a second value (for example, "disable"), it indicates that the terminal device cannot reserve the transmission resources for the sidelink data. Further, a cycle of the resources that the terminal device may reserve may be configured by using a parameter "reservationPeriodAllowed". The value of the parameter, for example, is {0, 20, 50, 100, 200, 300, 400, 500, 600, 700, 800, 900, 1000} ms. As shown in FIG. 8, the terminal device selects two resources at moment n, and the two resources are respectively located at n+t1 and n+t2, and the two transmission resources are configured to transmit first sidelink data (including first transmission and retransmission). The resource pool allows the terminal device to reserve the transmission resources for the next sidelink data, that is to say, the value of the parameter reserveResourceDifferentTB is enable, and a service period of the terminal is 100 ms. In this way, the terminal device carries the first indication information in the SCI, for example, the first indication information is a resource reservation period, and indicates 100 ms. That is to say, it indicates that the terminal device reserves two resources after 100 ms, that is, two resources correspond to n+100+t1 and n+100+t2, and are configured to transmit second sidelink data (including first transmission and retransmission). When new sidelink data arrives at the terminal device, the two resources corresponding to n+100+t1 and n+100+t2 may be used for transmission. The above uses two resources as an example, if the terminal device selects N resources, a first information field in the SCI is used to indicate time-frequency information of N transmission resources, a second information field (such as a resource reservation period) in the SCI is used to indicate the reservation of N transmission resources of a next period, and the N resources of the next period are configured to transmit different sidelink data.

At step 702, the second terminal device adjusts a continuously monitoring duration of the second terminal device according to the first indication information, where the transmission time when the first terminal device transmits the sidelink data next time is within the continuously monitoring duration.

Further, the second terminal device may adjust the continuously monitoring duration of the second terminal device by adopting any of the following manners.

A) The second terminal device adjusts one or more DRX parameters in first DRX configuration information. The one or more DRX parameters are used for determining the continuously monitoring duration of the second terminal device, and the transmission time when the first terminal device transmits the sidelink data next time is within the continuously monitoring duration.

B) The second terminal device starts a first timer before the transmission time when the sidelink data is transmitted next time. The first timer is used for determining the continuously monitoring duration of the second terminal device, and the transmission time when the first terminal device transmits the sidelink data next time is within the continuously monitoring duration.

Herein, during the operation of the first timer (or before expiry). the second terminal device is in a continuously monitoring (that is, on duration) state, and the time period corresponding to the operation period of the first timer is the continuously monitoring duration of the second terminal device. Herein, the first timer, for example, is a timer determined by the first DRX parameter (for example, drx-onDurationTimer), or a timer determined by the second DRX parameter (for example, drx-InactivityTimer), or a timer determined by other DRX parameters.

In the embodiment of the disclosure, when the first terminal device indicates the transmission resource of the current PSSCH through the SCI, it may simultaneously indicate that the resource is reserved for the transmission of the next sidelink data (that is, the first indication information carried by the SCI indicates that the resource is reserved for the transmission of the next sidelink data). The second terminal device receives the SCI, and acquires the carried first indication information. The transmission time when the first terminal device transmits the next sidelink data may be learned from the first indication information. In this way, the second terminal device may adjust the DRX parameters, to cause the second terminal device to be in the on duration when the first terminal device sends the next sidelink data. Therefore, the sidelink data can be correctly received.

Figure 9A:
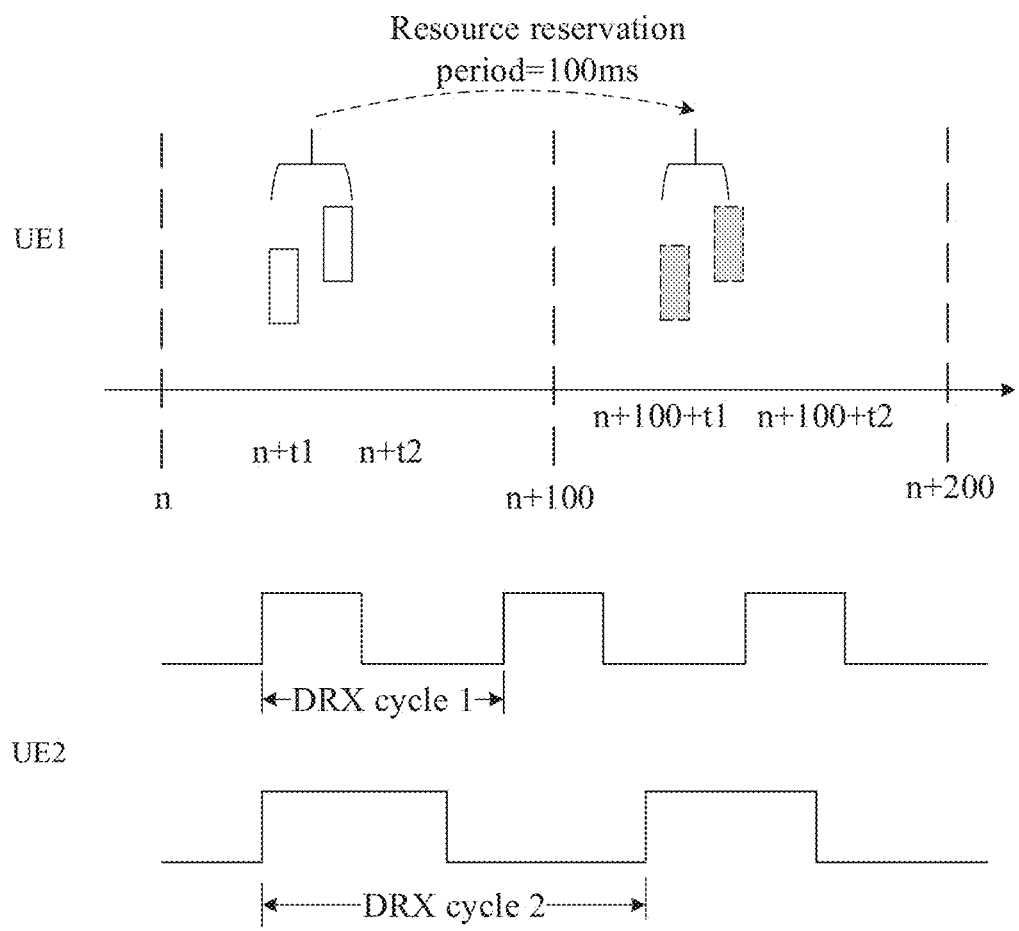
FIG. 9A is a second schematic diagram of a DRX pattern according to an embodiment of the disclosure.

As shown in FIG. 9A, the upper part is a schematic diagram of the UE 1 (the sending end) reserving a resource, and the middle part is a DRX pattern of the UE 2 (the receiving end). When the UE 2 receives the SC of the UE 1 at n+t1 and learns that the UE 1 reserves a transmission resource at a moment n+100+t1, the UE 2 will adjust the DRX parameters. that is, the DRX pattern shown in the middle part is adjusted into a DRX pattern shown in the lower part, so that the sidelink data sent by the UE 1 at n+100+t1 is within the on duration of the UE 2. Therefore, the UE 2 can receive the sidelink data sent by the UE 1.

Figure 9B:
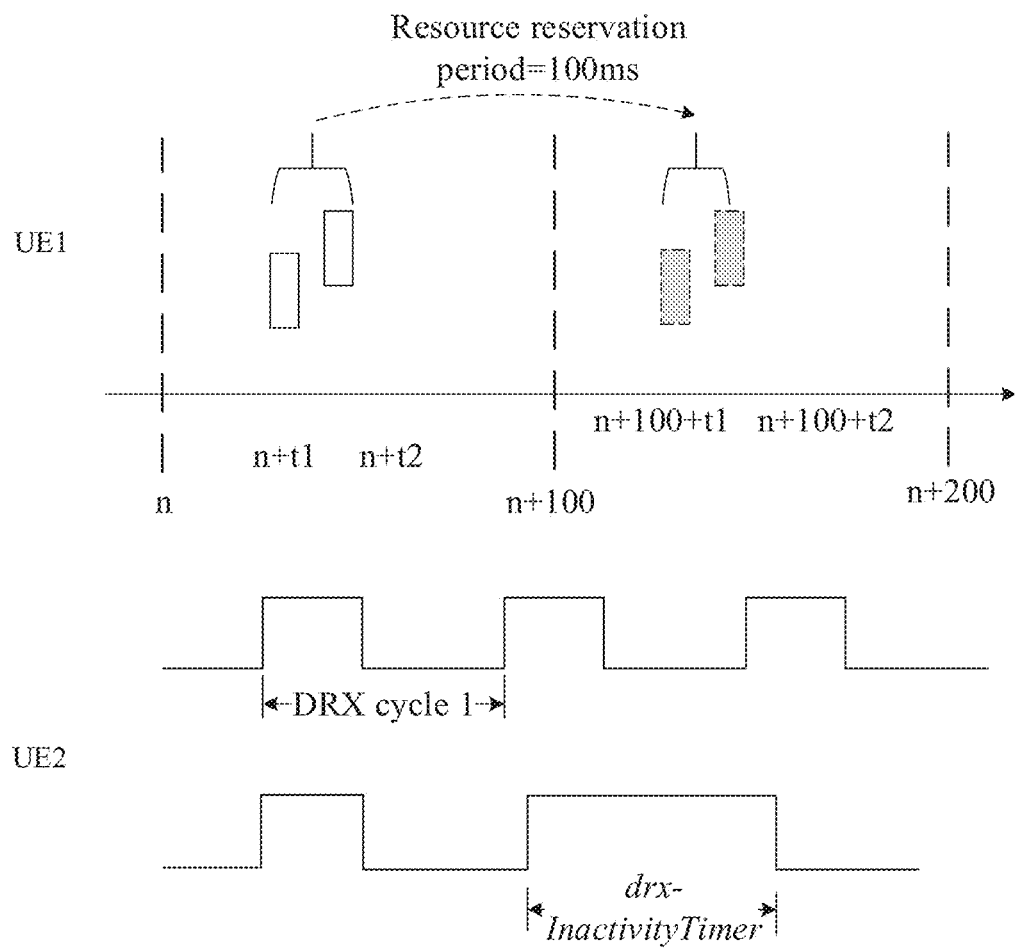
FIG. 9B is a third schematic diagram of a DRX pattern according to an embodiment of the disclosure.

As shown in FIG. 9B, the upper part is a schematic diagram of the UE 1 (the sending end) reserving a resource, and the middle part is a DRX pattern of the UE 2 (the receiving end). When the UE 2 receives the SCI of the UE 1 at n+t1 and learns that the UE 1 reserves a transmission resource at the moment n+100+t1, the UE 2 will start the first timer (for example, drx-onDurationTimer or drx-InactivityTimer) before the moment n+100+t1, so that the continuously monitoring duration of the second terminal device is expanded, and the moment n+100+t1 is within the continuously monitoring duration of the second terminal device. Therefore, the UE 2 can receive the sidelink data sent by the UE 1.

In the embodiment of the disclosure, after learning the transmission time when the first terminal device transmits the sidelink data next time, the second terminal device adjusts one or more DRX parameters. or starts the first timer before receiving the sidelink data next time, so that the transmission time when the first terminal device transmits the sidelink data next time is within the continuously monitoring duration of the second terminal device, thereby ensuring the reliability of sidelink transmission.

Figure 10:
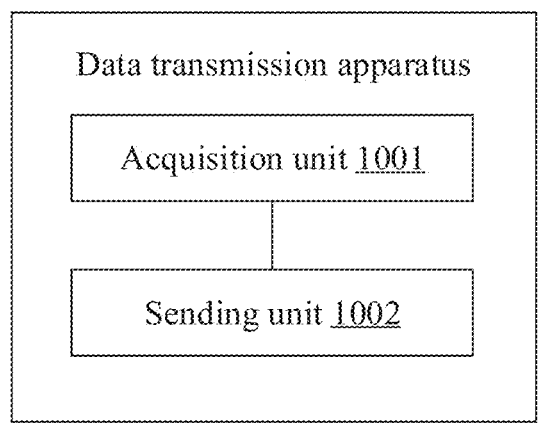
FIG. 10 is a schematic structural composition diagram of a data transmission apparatus according to an embodiment of the disclosure.

FIG. 10 is a schematic structural composition diagram of a data transmission apparatus according to an embodiment of the disclosure. As shown in FIG. 10, the data transmission apparatus includes an acquisition unit and a sending unit.

The acquisition unit 1001 is configured to acquire first DRX configuration information. The first DRX configuration information is used for determining a continuously monitoring duration of a second terminal device.

The sending unit 1002 is configured to send the sidelink data to the second terminal device within the continuously monitoring duration of the second terminal device.

In an optional implementation. the first DRX configuration information is the DRX configuration information of the second terminal device.

The acquisition unit 1001 is configured to acquire network configuration information, and the network configuration information comprises the first DRX configuration information.

In an optional implementation, the network configuration information is carried in an SIB message, or RRC signaling, or DCI.

In an optional implementation. the first DRX configuration information is the DRX configuration information of the second terminal device.

The acquisition unit 1001 is configured to acquire pre-configuration information, and the pre-configuration information comprises the first DRX configuration information.

In an optional implementation, the acquisition unit 100W1 is configured to acquire resource pool configuration information, and the resource pool configuration information includes the first DRX configuration information.

In an optional implementation, the first DRX configuration information is the DRX configuration information of the second terminal device.

The acquisition unit 1001 is configured to receive the first DRX configuration information sent by the second terminal device, or receive configuration information sent by a third terminal device. The configuration information includes the first DRX configuration information. The first terminal device, the second terminal device and the third terminal device belong to a same communication group.

In an optional implementation, the first DRX configuration information is carried in SCI, or PC5-RRC signaling, or an MAC CE.

In an optional implementation, the apparatus further includes the sending unit.

The sending unit (not shown) is configured to send first indication information to the second terminal device. The first indication information is used for determining a transmission time when the first terminal device transmits sidelink data next time.

The first indication information is used for the second terminal device to adjust a continuously monitoring duration of the second terminal device. The transmission time when the first terminal device transmits the sidelink data next time is within the continuously monitoring duration.

Those skilled in the art should understand that, for the relevant description of the above data transmission apparatus in the embodiments of the disclosure, refer to the relevant description of the data transmission method in the embodiments of the disclosure for understanding.

Figure 11:
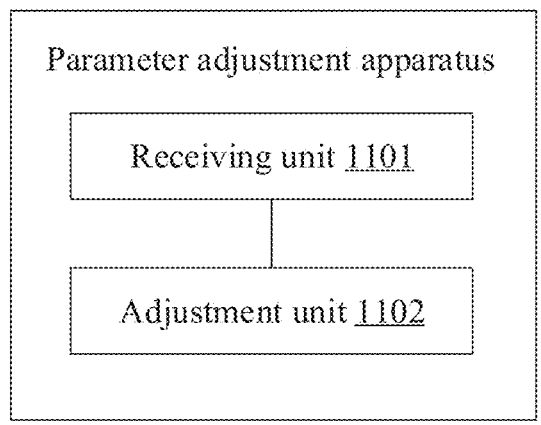
FIG. 11 is a schematic structural composition diagram of a parameter adjustment apparatus according to an embodiment of the disclosure.

FIG. 11 is a schematic structural composition diagram of a parameter adjustment apparatus according to an embodiment of the disclosure. As shown in FIG. 11, the parameter adjustment apparatus includes a receiving unit and an adjustment unit.

The receiving unit 1101 is configured to receive first indication information sent by a first terminal device. The first indication information is used for determining a transmission time when the first terminal device transmits sidelink data next time.

The adjustment unit 1102 is configured to adjust, according to the first indication information, a continuously monitoring duration of the second terminal device, and the transmission time when the first terminal device transmits the sidelink data next time is within the continuously monitoring duration.

In an optional implementation, the adjustment unit 1102 is configured to adjust one or more DRX parameters in first DRX configuration information. The one or more DRX parameters are used for determining the continuously monitoring duration of the second terminal device. The transmission time when the first terminal device transmits the sidelink data next time is within the continuously monitoring duration.

In an optional implementation, the adjustment unit 1102 is configured to start a first timer before the transmission time when the sidelink data is transmitted next time. The first timer is used for determining the continuously monitoring duration of the second terminal device. The transmission time when the first terminal device transmits the sidelink data next time is within the continuously monitoring duration.

In an optional implementation, the receiving unit 1101 is configured to receive SCI sent by the first terminal device at a first moment. The SCI carries the first indication information, and the first indication information is configured to indicate a first time interval. The transmission time when the first terminal device transmits the sidelink data next time is equal to the first moment plus the first time interval.

Those skilled in the art should understand that, for the relevant description of the above data transmission apparatus in the embodiments of the disclosure, refer to the relevant description of the data transmission method in the embodiments of the disclosure for understanding.

Figure 12:
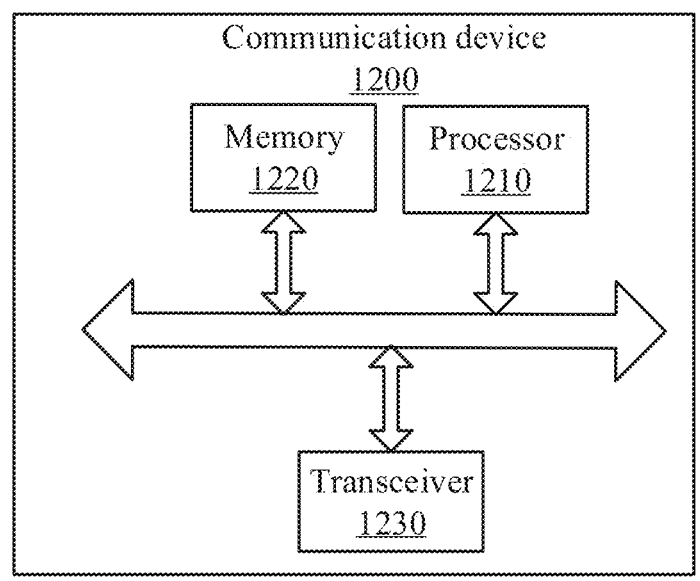
FIG. 12 is a schematic structural diagram of a communication device according to an embodiment of the disclosure.

FIG. 12 is a schematic structural diagram of a communication device 1200 according to an embodiment of the disclosure. The communication device may be a terminal device. The communication device 1200 shown in FIG. 12 includes a processor 1210. The processor 1210 may invoke and run a computer program in a memory to implement the method in the embodiments of the disclosure.

Optionally, as shown in FIG. 12. the communication device 1200 may further include the memory 1220. The processor 1210 may invoke and run the computer program in the memory 1220 to implement the method in the embodiments of the disclosure.

The memory 1220 may be an independent device independent of the processor 1210 and may also be integrated into the processor 1210.

Optionally, as shown in FIG. 12, the communication device 1200 may further include a transceiver 1230. The processor 1210 may control the transceiver 1230 to communicate with another device, specifically transmitting information or data to another device or receiving information or data transmitted by another device.

The transceiver 1230 may include a transmitter and a receiver. The transceiver 1230 may further include antennae, and there may be one or more antennae.

Optionally, the communication device 1200 may specifically be a network device in the embodiment of the disclosure. The communication device 1200 may implement corresponding flows implemented by the network device in each method of the embodiments of the disclosure. For simplicity, elaborations are omitted herein.

Optionally, the communication device 1200 may specifically be a mobile terminal/terminal device in the embodiment of the disclosure. The communication device 1200 may implement corresponding flows implemented by the mobile terminal/terminal device in each method of the embodiments of the disclosure. For simplicity, elaborations are omitted herein.

Figure 13:
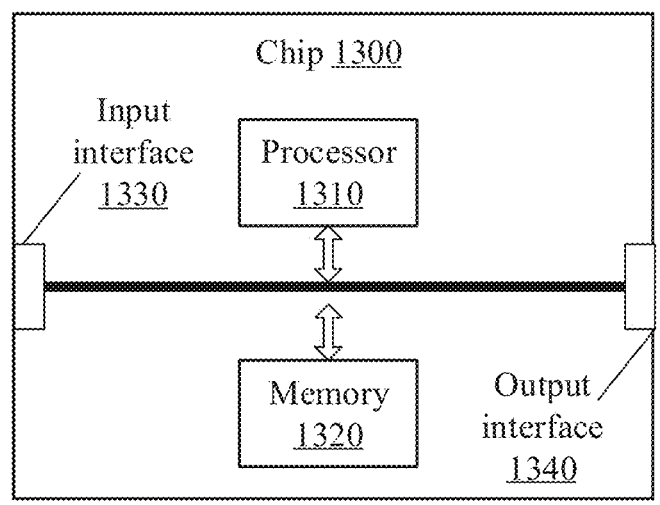
FIG. 13 is a schematic structural diagram of a chip according to an embodiment of the disclosure.

FIG. 13 is a schematic structural diagram of a chip according to an embodiment of the disclosure. The chip 1300 shown in FIG. 13 includes a processor 1310. The processor 1310 may invoke and run a computer program in a memory to implement the method in the embodiments of the disclosure.

Optionally, as shown in FIG. 13, the chip 1300 may further include the memory 1320. The processor 1310 may invoke and run the computer program in the memory 1320 to implement the method in the embodiments of the disclosure.

The memory 1320 may be an independent device independent of the processor 1310 and may also be integrated into the processor 1310.

Optionally, the chip 1300 may further include an input interface 1330. The processor 1310 may control the input interface 1030 to communicate with another device or chip, specifically acquiring information or data transmitted by another device or chip.

Optionally, the chip 1300 may further include an output interface 1340. The processor 1310 may control the output interface 1340 to communicate with another device or chip, specifically outputting information or data transmitted by another device or chip.

Optionally, the chip is applicable to the network device in the embodiments of the disclosure, and the chip may implement corresponding flows implemented by the network device in each method of the embodiments of the disclosure. For simplicity, elaborations are omitted herein.

Optionally, the chip is applicable to the mobile terminal/terminal device in the embodiments of the disclosure, and the chip may implement corresponding flows implemented by the mobile terminal/terminal device in each method of the embodiments of the disclosure. For simplicity, elaborations are omitted herein.

It is to be understood that the chip mentioned in the embodiment of the disclosure may also be called as a system-level chip, a system chip, a chip system, or a system on chip.

Figure 14:
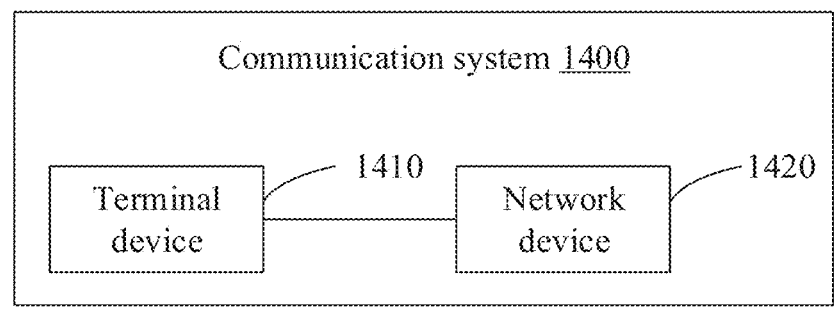
FIG. 14 is a schematic block diagram of a communication system according to an embodiment of the disclosure.

FIG. 14 is a schematic block diagram of a communication system 1400 according to an embodiment of the disclosure. As shown in FIG. 14, the communication system 1400 includes a terminal device 1410 and a network device 1420.

The terminal device 1410 may be configured to implement corresponding functions implemented by the terminal device. The network device 1420 may be configured to implement the corresponding functions implemented by the network in the above method. For simplicity, elaborations are omitted herein.

It is to be understood that the processor in the embodiment of the disclosure may be an integrated circuit chip and has a signal processing capacity. During implementation. each step of the method embodiments may be completed by an integrated logical circuit of hardware in the processor or an instruction in a software form. The above processor may be a general processor, a Digital Signal Processor (DSP). an Application Specific Integrated Circuit (ASIC), a Field-Programmable Gate Array (FPGA) or other programmable logic devices, discrete gate or transistor logic devices, and discrete hardware components. Each method, step and logical block diagram disclosed in the embodiments of the disclosure may be implemented or executed. The general processors may be microprocessors or the processor may also be any conventional processors. In combination with the method disclosed in the embodiments of the disclosure, the steps may be directly implemented by a hardware processor, or may be performed by a combination of hardware and software modules in the decoding processor. The software module may be located in a mature storage medium in the field such as a Random Access Memory (RAM), a flash memory, a Read-Only Memory (ROM), a Programmable ROM (PROM) or Electrically Erasable PROM (EEPROM), and a register. The storage medium is located in a memory. and the processor reads information in the memory, and completes the steps of the method in combination with hardware.

It is to be understood that the memory in the embodiment of the disclosure may be a volatile memory or a non-volatile memory, or may include both the volatile and non-volatile memories. The non-volatile memory may be an ROM, a PROM, an Erasable PROM (EPROM), an EEPROM or a flash memory. The volatile memory may be an RAM, and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is to be understood that, the above memory is exemplarily but unlimitedly described that the memory in the embodiments of the disclosure may further be as SRAM, a DRAM, an SDRAM, a DDR SDRAM, an ESDRAM, an SLDRAM, and a DR RAM. That is to say, the memory in the embodiments of the disclosure is intended to include, but not limited to, memories of these and any other proper types.

An embodiment of the disclosure further provides a computer-readable storage medium, configured to store a computer program.

Optionally, the computer-readable storage medium is applicable to a network device in the embodiments of the disclosure. and the computer program causes a computer to execute corresponding flows implemented by the network device in each method of the embodiments of the disclosure. For simplicity, elaborations are omitted herein.

Optionally, the computer-readable storage medium is applicable to a mobile terminal/terminal device in the embodiments of the disclosure, and the computer program causes a computer to execute corresponding flows implemented by the mobile terminal/terminal device in each method of the embodiments of the disclosure. For simplicity. elaborations are omitted herein.

An embodiment of the disclosure further provides a computer program product, including a computer program instruction.

Optionally, the computer program product is applicable to a network device in the embodiments of the disclosure, and the computer program causes a computer to execute corresponding flows implemented by the network device in each method of the embodiments of the disclosure. For simplicity, elaborations are omitted herein.

Optionally, the computer program product is applicable to a mobile terminal/terminal device in the embodiments of the disclosure, and the computer program instruction causes a computer to execute corresponding flows implemented by the mobile terminal/terminal device in each method of the embodiments of the disclosure. For simplicity, elaborations are omitted herein.

An embodiment of the disclosure further provides a computer program.

Optionally, the computer program is applicable to a network device in the embodiments of the disclosure. When the computer program is run on a computer, the computer executes corresponding flows implemented by the network device in each method of the embodiments of the disclosure. For simplicity, elaborations are omitted herein.

Optionally, the computer program is applicable to a mobile terminal/terminal device in the embodiments of the disclosure. When the computer program is run on a computer, the computer executes corresponding flows implemented by the mobile terminal/terminal device in each method of the embodiments of the disclosure. For simplicity, elaborations are omitted herein.

Those of ordinary skill in the art may realize that the units and algorithm steps of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such implementation shall fall within the scope of the disclosure.

Those skilled in the art may clearly learn about that specific working processes of the system, apparatus, and units described above may refer to the corresponding processes in the above method embodiments and will not be elaborated herein for ease and briefness of description.

In several embodiments provided by the disclosure, it is to be understood that the disclosed system, apparatus and method may be implemented in other ways. For example, the apparatus embodiment described above is only schematic, and for example, division of the units is only logic function division. and other division manners may be adopted during practical implementation. For another example, a plurality of units or components may be combined or integrated into another system, or some characteristics may be neglected or not executed. In addition, the displayed or discussed mutual coupling or direct coupling or communication connection may be indirect coupling or communication connection through some interfaces, apparatuses or units, and may be in electrical, mechanical or other forms.

The units described as separate components may or may not be physically separated. The components displayed as units may or may not be physical units, that is, the components may be located in one place, or may be distributed on the plurality of network units. Part or all of the units may be selected according to actual requirements to achieve the purposes of the solutions of the embodiment.

In addition, the functional units in the various embodiments of the disclosure may be integrated into one processing unit, or each unit may exist alone physically, or two or more than two units may be integrated into one unit.

If the function is implemented in the form of the software functional unit and sold or used as an independent product, it can be stored in the computer readable storage medium. Based on this understanding, the technical solutions of the disclosure essentially or the parts that contribute to the prior art, or part of the technical solutions can be embodied in the form of a software product. The computer software product is stored in a storage medium, including a plurality of instructions for causing a computer device (which may be a personal computer, a server, or a network device, and the like) to execute all or part of the steps of the method described in the various embodiments of the disclosure. The storage medium includes: various media capable of storing program codes such as a USB flash disk, a mobile Hard Disk Drive (HDD), an ROM, an RAM, a magnetic disk or an optical disk.

The above is only the specific implementations of the disclosure and not intended to limit the scope of protection of the disclosure. Any variations or replacements apparent to those skilled in the art within the technical scope disclosed by the disclosure shall fall within the scope of protection of the disclosure. Therefore, the protection scope of the disclosure shall be subject to the protection scope of the claims.

The invention claimed is:

1. A data transmission method, comprising:
acquiring, by a first terminal device, first Discontinuous Reception (DRX) configuration information, wherein the first DRX configuration information is used for determining a continuously monitoring duration of a second terminal device; and
sending, by the first terminal device, sidelink data to the second terminal device within the continuously monitoring duration of the second terminal device,
wherein the method further comprises:
sending, by the first terminal device, first indication information to the second terminal device, the first indication information being used for determining a transmission time when the first terminal device transmits the sidelink data next time,
wherein the first indication information is used for the second terminal device to adjust the continuously monitoring duration of the second terminal device, and the transmission time when the first terminal device transmits the sidelink data next time is within an adjusted continuously monitoring duration.

2. The method of claim 1, wherein the first DRX configuration information is DRX configuration information of the second terminal device, and acquiring, by the first terminal device, the first DRX configuration information comprises:
acquiring, by the first terminal device, network configuration information, wherein the network configuration information comprises the first DRX configuration information.

3. The method of claim 2, wherein the network configuration information is carried in a System Information Block (SIB) message, or Radio Resource Control (RRC) signaling.

4. The method of claim 1, wherein the first DRX configuration information is DRX configuration information of the second terminal device, and acquiring, by the first terminal device, the first DRX configuration information comprises:
acquiring, by the first terminal device, pre-configuration information, wherein the pre-configuration information comprises the first DRX configuration information.

5. The method of claim 1, wherein the first DRX configuration information is DRX configuration information of the second terminal device, and acquiring, by the first terminal device, the first DRX configuration information comprises:
receiving, by the first terminal device, the first DRX configuration information sent by the second terminal device.

6. The method of claim 5, wherein the first DRX configuration information is carried in PC5-RRC signaling.

7. The method of claim 1, wherein the first DRX configuration information comprises at least one of the following DRX parameters:
a first DRX parameter drx-onDurationTimer;
a second DRX parameter drx-InactivityTimer;
a third DRX parameter including drx-LongCycle and drx-StartOffset; or a fourth DRX parameter drx-SlotOffset.

8. A data transmission apparatus for use in a first terminal device, the apparatus comprising:
a memory storing processor-executable instructions; and
a processor configured to execute the stored processor-executable instructions to perform operations of:
acquiring first Discontinuous Reception (DRX) configuration information, wherein the first DRX configuration information is used for determining a continuously monitoring duration of a second terminal device; and
sending sidelink data to the second terminal device within the continuously monitoring duration of the second terminal device,
wherein the processor is configured to execute the stored processor-executable instructions to further perform an operation of:
sending first indication information to the second terminal device, the first indication information being used for determining a transmission time when the first terminal device transmits sidelink data next time,
wherein the first indication information is used for the second terminal device to adjust a continuously monitoring duration of the second terminal device; and the transmission time when the first terminal device transmits the sidelink data next time is within an adjusted continuously monitoring duration.

9. The apparatus of claim 8, wherein the first DRX configuration information is DRX configuration information of the second terminal device, and acquiring the first DRX configuration information comprises:
acquiring network configuration information, wherein the network configuration information comprises the first DRX configuration information.

10. The apparatus of claim 9, wherein the network configuration information is carried in a System Information Block (SIB) message, or Radio Resource Control (RRC) signaling.

11. The apparatus of claim 8, wherein the first DRX configuration information is DRX configuration information of the second terminal device, and acquiring the first DRX configuration information comprises:
acquiring pre-configuration information, wherein the pre-configuration information comprises the first DRX configuration information.

12. The apparatus of claim 8, wherein the first DRX configuration information is DRX configuration information of the second terminal device, and acquiring the first DRX configuration information comprises:
receiving the first DRX configuration information sent by the second terminal device.

13. The apparatus of claim 12, wherein the first DRX configuration information is carried in PC5-RRC signaling.

14. The apparatus of claim 8, wherein the first DRX configuration information comprises at least one of the following DRX parameters:
a first DRX parameter drx-onDurationTimer;
a second DRX parameter drx-InactivityTimer;
a third DRX parameter including drx-LongCycle and drx-StartOffset; or
a fourth DRX parameter drx-SlotOffset.

15. A chip, comprising: a processor, configured to invoke and run a computer program from a memory, to cause a first terminal device having the chip mounted to perform operations of:
acquiring first Discontinuous Reception (DRX) configuration information, wherein the first DRX configuration information is used for determining a continuously monitoring duration of a second terminal device; and sending sidelink data to the second terminal device within the continuously monitoring duration of the second terminal device, wherein the first terminal device having the chip mounted is caused to further perform an operation of:

sending first indication information to the second terminal device, the first indication information being used for determining a transmission time when the first terminal device transmits sidelink data next time, wherein the first indication information is used for the second terminal device to adjust a continuously monitoring duration of the second terminal device; and the transmission time when the first terminal device transmits the sidelink data next time is within an adjusted continuously monitoring duration.

16. The chip of claim 15, wherein the first DRX configuration information is DRX configuration information of the second terminal device, and acquiring the first DRX configuration information comprises:

acquiring network configuration information, wherein the network configuration information comprises the first DRX configuration information.

17. The chip of claim 16, wherein the network configuration information is carried in a System Information Block (SIB) message, or Radio Resource Control (RRC) signaling.

18. The chip of claim 15, wherein the first DRX configuration information is DRX configuration information of the second terminal device, and acquiring the first DRX configuration information comprises:

acquiring pre-configuration information, wherein the pre-configuration information comprises the first DRX configuration information.

19. The chip of claim 15, wherein the first DRX configuration information is DRX configuration information of the second terminal device, and acquiring the first DRX configuration information comprises:

receiving the first DRX configuration information sent by the second terminal device.

20. The chip of claim 19, wherein the first DRX configuration information is carried in PC5-RRC signaling.

* * * * *